C. E. DUPELL.
SPRING TIRE FOR VEHICLE WHEELS.
APPLICATION FILED MAR. 23, 1918.
1,284,265.
Patented Nov. 12, 1918.
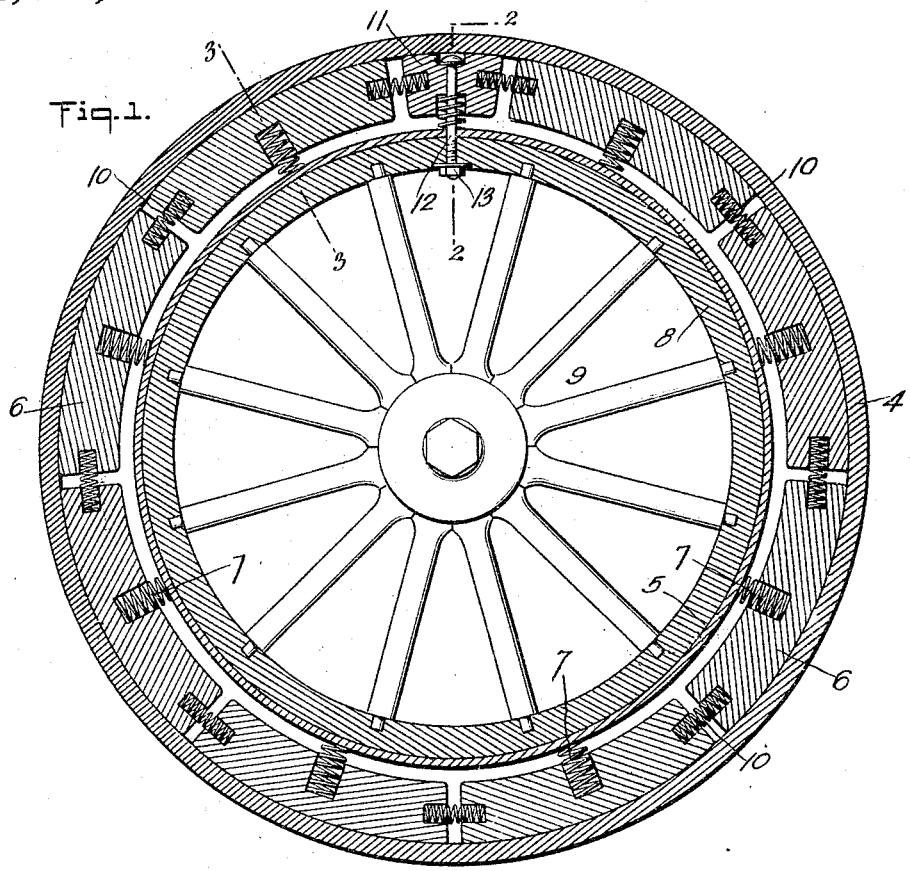
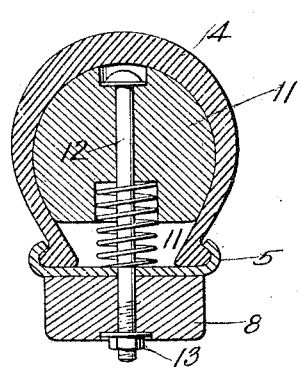
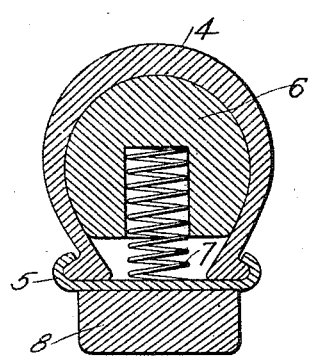
WITNESSES
INVENTOR
C. E. Dupell
BY
ATTORNEYS

UNITED STATES PATENT OFFICE.

CHARLES EDWARD DUPELL, OF BROOKLYN, NEW YORK.

SPRING-TIRE FOR VEHICLE-WHEELS.

1,284,265.

Specification of Letters Patent. Patented Nov. 12, 1918.

Application filed March 23, 1918. Serial No. 224,316.

*To all whom it may concern:*

Be it known that I, CHARLES EDWARD DU-PELL, a citizen of the United States, and a resident of the city of New York, borough of Brooklyn, in the county of Kings and State of New York, have invented a new and Improved Spring-Tire for Vehicle-Wheels, of which the following is a full, clear, and exact description.

My invention relates to tires of the resilient type, in which a removable yielding filler is substituted for the pneumatic tube.

An object of the invention is to provide a simple and inexpensive tire of the resilient type in which the filler is in the shape of a sectional annulus flattened on the inner surface to provide the necessary clearance for permitting the shoe to yield under load, the clearing space also serving for the accommodation of the springs which tend to expand the filler.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is a vertical section through the plane of a wheel provided with a resilient tire embodying my invention;

Fig. 2 is a cross section on line 2—2, Fig. 1; and

Fig. 3 is a similar section on line 3—3, Fig. 1.

Referring to the drawings, 4 is a standard rubber shoe used with pneumatic tires. The shoe is shown mounted on a clencher rim 5, but, if desired, it may be mounted on a demountable rim. Within the shoe is a filler in the shape of an annulus divided into sections 6, each section being flattened on the inner periphery, best shown in Figs. 2 and 3. The sections 6 of the filler are made of wood. The cross-sectional diameter of each section is equal to that of a fully inflated pneumatic tube, with the exception of the flattened part which is to face the rim and, therefore, does not contact with the shoe.

The clearance formed betwen the flattened surface of each section and the rim 5 provides the necessary space to allow the shoe to yield under load, the resistance to the yield being formed by springs 7 which tend normally to move the sections of the filler outwardly and maintain the filler in contact with the shoe 4. The springs 7 are nested in the sections 6, preferably each section being provided with one spring which is located in the central part of the section, the springs 7 resting on the rim 5 which is mounted in any suitable way on the felly 8 of the wheel 9.

The adjacent sections of the filler are spaced by means of springs 10 nested in the ends of the sections, these springs coming into play and helping the coil springs 7 as a section or sections 6 are caused to move inwardly by the load.

To prevent the sectional filler from floating in the shoe as the wheel rolls, I provide a locking block forming a section 11, which section is shorter than the other sections 6. This section 11 carries a bolt 12 for which the rim and felly have an opening so that the bolt may be locked to the felly by means of a nut 13. The bolt prevents the section 11 from moving in the plane of the wheel, thereby preventing the sectional filler from floating in the shoe. The spring 7 for the block 11 is mounted on the bolt 12. The bolt 12 has a head sunk in the block, which causes the block to be drawn toward the rim against the resistance of the spring 7 when the nut 13 is threaded on to the bolt.

I claim:

In combination, a shoe, a sectional filler in the shape of an annulus having a flattened inner surface providing the clearance necessary to allow the shoe to yield under load, springs nested in the ends of the sections for maintaining said sections spaced within the shoe, a spring nested in each of the sections at the flattened surface, said springs tending to resist the movement of the shoe inwardly, and an anchoring bolt associated with one of said sections to prevent the filler from floating in the shoe.

CHARLES EDWARD DUPELL.

Copies of this patent may be obtained for five cents each, by addressing the "Commissioner of Patents, Washington, D. C."